Patented Aug. 7, 1951

2,563,793

UNITED STATES PATENT OFFICE 2,563,793

TREATMENT OF CORN STEEP WATER FOR PENICILLIN PRODUCTION

Wendell W. Moyer, Decatur, Ill., assignor to A. E. Staley Manufacturing Company, Decatur, Ill., a corporation of Delaware No Drawing. Application December 31, 1946, Serial No. 719,628

3 Claims. (Cl. 195—36)

The present invention relates to nutrient compositions used in the culturing of microorganisms and to the preparation of fermentation products produced thereby. More specifically, it has to do with the culturing of microorganisms for the production of antibiotic substances, such as penicillin and streptomycin by way of examples, having particular reference to culturing methods wherein the nutrient adjunct contains a combination of corn steepwater material and added natural amino acids.

A principal object of the invention is the provision of a nutrient adjunct which when used in the culturing of microorganisms will stimulate the microorganisms to generate increased yield of desired substances.

Another object of the invention is the provision of a nutrient adjunct which when used in the culturing of microorganisms stimulates the microorganisms to produce fermentation products at an increased rate, whereby increased yields of such products can be obtained in unit time from a given plant or unit of equipment.

An additional object of the invention is the provision of a nutrient adjunct which when used in the culturing of microorganisms causes the microorganisms to generate increased concentrations of fermentation products in the culture medium, thereby providing for increased efficiency in the recovery and purification of the fermentation products.

Still another object of the invention is the provision of a nutrient adjunct which when used in the culturing of penicillin-producing molds stimulates the mold to generate increased yields of penicillin.

A further object of the invention is the provision of a nutrient adjunct which when used in the culturing of streptomycin-producing microorganisms stimulates the microorganisms to generate increased yields of streptomycin.

A still further object of the invention is the preparation of fermentation products by culturing microorganisms in media containing nutrient adjuncts prepared in accordance with the invention.

Other objects of the invention will in part be obvious and will in part appear hereinafter.

The invention accordingly comprises the several steps and the relation of one or more such steps with respect to each of the others, and the product possessing the features, properties, and relation of constituents, which are exemplified in the following disclosure, and whose scope of application is indicated in the appended claims.

In a biological process, as in any chemical process, increased efficiency in the transformation of raw material into the desired end product is of prime importance. Where the yield in such processes is small and the cost of recovery of desired product from a large proportion of waste material is high, the yield becomes a controlling factor in the cost of production.

In the production of antibiotic substances from microorganisms by present fermentation methods, the yield of these substances is only a small fraction of one percent of the weight of nutrient materials used in the culture media. Consequently, the desired substance in the spent culture medium must be concentrated and isolated from relatively large volumes of liquor. This is commonly done by means of selective adsorption or solvent extraction processes. In addition to this, the fermentation processes are relatively slow, requiring several days to provide maximum yield of product. As a result of these limiting factors, large and numerous units of equipment are required to provide even small quantities of purified product from a single fermentation.

Owing to its high contents of nitrogenous materials, carbohydrates, phosphates, and potassium compounds, corn steepwater has long been recognized as an especially useful nutrient adjunct in the culturing of microorganisms, particularly the yeasts and molds. The importance of corn steepwater in the manufacture of penicillin from cultures of the appropriate molds is well known, and as yet no practical substitute has been found for this nutrient adjunct which stimulates the mold to produce much more penicillin than it does in ordinary culture media.

Even though the yields of penicillin from unit volume of fermentation broth have been increased many fold by the use of corn steepwater as a nutrient adjunct, they are still extremely small when calculated as percentages of the weights of nutrient materials used. Consequently much work has been directed toward further increasing the yield and thus reducing the cost of this extraordinary antibiotic substance. Some increases in yield have been obtained by the use of newly developed mold strains, by refinements in fermentation and product-isolation techniques, and by use of culture media that are better balanced with respect to their proportions of ingredients, but additional increases are highly desirable.

Some progress has also been made on increasing the yield of penicillin by supplementing the mold culture media containing corn steepwater with various substances, chiefly derivatives of phenylacetic acid and phenylethyl amine. The idea behind the use of these substances is to provide ready-made structural elements which the mold can use in building up the penicillin molecule. In this way it has been possible to increase the penicillin yield somewhat, and also to provide new types of penicillin, differing in chemical structure.

It has been suggested heretofore that a combination of about two parts of corn steepwater solids and one part protein hydrolyzate solids be used in the fermentation production of penicillin. However, the use of this combiantion provided a lower yield of penicillin than did the use of steepwater alone.

In accordance with the present invention, substantial increases in penicillin yields are obtained by replacing the hitherto used corn steepwater adjuncts to the culture media with a combination of corn steepwater and amino acids wherein the weight ratio of amino acids to steepwater solids is limited to a specified range of values. Beneficial results are obtained within the range of 0.002 to 0.400 for this ratio, i. e., from 0.2 to 40 percent by weight of amino acids based on the weight of steepwater solids or dry substance. Excellent results, often as much as 33 percent increase in penicillin yield, are obtained with ratios of amino acids to steepwater solids that do not exceed 10 percent.

Natural amino acids, such as those obtained by hydrolysis of proteins, are preferred, and among them cystine, leucine, iso leucine, glutamic acid, and arginine are the most outstanding in their stimulatory effects. Of the three main classes of natural amino acids, basic, neutral, and acidic, the neutral or monoamino-monocarboxylic acids are preferred. Mixtures of the amino acids may be used and, as indicated, mixtures including one or more of the above specifically mentioned amino acids are preferred. Proteins, either vegetable or animal, constitute the principal source of natural amino acids. Protein hydrolyzates, or fractions of amino acids obtained therefrom, may be advantageously used in accordance with this invention, provided the amino acid raw material thus introduced into the culture medium does not contain impurities which are themselves deleterious to the growth of the microorganisms or are converted into inhibitory substances. Other factors being equal, proteins rich in cystine, leucine, isoleucine, glutamic acid or arginine are the preferred sources of amino acids.

Any corn steepwater nutrient adjunct used in the preparation of penicillin may be improved by combining it with amino acids according to this invention. Illustrative corn steepwater nutrient adjuncts which may be thus improved are ordinary steepwater and specially prepared corn steepwater materials such as those disclosed in patent applications bearing Serial Numbers 592,293 and 633,849 and filed May 5, 1945, and December 8, 1945, respectively.

As obtained from the steeps, corn steepwater is a readily fermentable aqueous liquor containing only a few percent of dissolved material. Accordingly, it is common practice to concentrate the original steepwater, preferably under vacuum, to a heavy liquor containing about 50 percent solids before it is stored or shipped.

The preferred method of preparing the corn steepwater-amino acid composition is to add the amino acids or amino acid bearing material in correct proportion to the finished concentrated steepwater product. In case isolated amino acids are used and they are insoluble or difficultly soluble in the concentrated steepwater at its normal pH, they may first be dissolved in a minimum amount of aqueous acid or alkali, and then added to the steepwater. When prior solution of the amino acids is desired, solution in an acid is preferred, because the moderate lowering of pH of the steepwater produced by addition of the acidic amino acid solution has an additional stimulating effect on the mold. The beneficial effects obtained by adjusting the pH of the steepwater product to a value somewhat below its normal range, especially when freshly prepared, are disclosed in more detail and claimed in an application filed December 31, 1946, Serial No. 719,627.

The above mentioned applications are now patented as Patent No. 2,444,176, issued June 29, 1948; Patent No. 2,515,157, issued July 11, 1950; and Patent No. 2,477,763, issued August 2, 1949, respectively.

When protein hydrolyzates are combined with corn steepwater products in accordance with this invention, the character and proportion of added hydrolyzate should be so controlled that the final composition does not contain proportions of acids, alkalies, salts, or other materials that are deleterious to the microorganisms being cultured.

Although it is preferred to use a prepared combination of amino acids and corn steepwater in the culturing of microorganisms, the same beneficial effect may be obtained by adding the steepwater and amino acids separately, and in the recommended proportions, to the culture medium. For example, addition of 0.04 to 0.20 part of leucine to a penicillin culture medium containing 2 parts of corn steepwater solids and the proper proportions of water and other materials would be equivalent to using a corresponding amount of pre-mixed steepwater composition containing from 2 to 10 percent by weight of leucine based on the solids content of the steepwater base.

Nutrient compositions prepared in accordance with this invention are useful in the culturing of microorganisms in general, especially the yeasts, molds, and bacteria. Their superiority over nutrient adjuncts hitherto known becomes most evident in the preparation of antibiotic substances by fermentation, particularly in the manufacture of penicillin.

The invention is more specifically illustrated by the following examples, which have to do with the preparation of penicillin by the culturing of suitable molds. Satisfactory methods for the growing of penicillin-producing molds in culture media containing corn steepwater, and for recovery and purification of the generated penicillin, are well known and need not be described here. The examples relate to the submerged culture technique, using *P. chrysogenum* X-1612 and Q-176. It is to be pointed out, however, that the invention applies equally well to any other technique of growing the mold and to the culturing of other penicillin-producing molds.

*Example 1*

A solution of 52 grams of pure natural leucine in 85 ml. of 20° Bé. hydrochloric acid was stirred into the modified steepwater. The pH of the resulting mixture was about 3.55. The solids content of the steepwater used was about 2300 grams, hence the percentage of added leucine based on steepwater solids was about 2.3. Use of this combination of steep water and leucine as a nutrient adjunct in the submerged culture fermentation production of penicillin increased the yield of penicillin 8% over the yield of a control run.

*Example 2*

Seventy-three grams of natural glutamic acid hydrochloride and 45 ml. of 20° Bé. hydrochloric acid were stirred into the modified steepwater, yielding a mixture having a pH of about 3.55 and containing about 2.1% glutamic acid based on steepwater solids. When tested in the submerged culture fermentation production of penicillin, this conbination increased the yield 8% over that obtained with the steepwater alone.

*Example 3*

Purified natural isoleucine was substituted for leucine in Example 1. This combination also increased the yield 8% over the control.

*Example 4*

Ninety-nine grams of natural arginine dihydrochloride was substituted for the leucine in Example 1, yielding a mixture having a pH of about 3.55 and containing about 3% arginine based on the steepwater solids. This combination increased the yield of penicillin about 8% over the control.

*Example 5*

Ninety-six grams of natural cystine was substituted for the leucine in Example 1. When the solution of cystine in the hydrochloric acid was stirred into the steepwater, yielding a mixture having a pH of about 3.55, it was observed that much of the cystine immediately precipitated. This was filtered off, and from the amount recovered, it was calculated that only about one-fourth of the amount added remained in solution, yielding a steepwater-cystine combination containing an estimated 1% of cystine based on steepwater solids. In this case, the yield of penicillin was increased about 23% over control runs.

*Example 6*

Crude natural leucine, known to contain appreciable proportions of isoleucine, methionine, valine, and phenylalanine, was substituted for the pure leucine in Example 1. The yield of penicillin was increased about 15% over the control.

The crude natural leucine was prepared as follows: Dry corn gluten, containing 11.2% nitrogen, was refluxed 24 hours with two parts of 23% hydrochloric acid. The hydrolysis mixture was diluted with an equal volume of cold water, neutralized to about 4.5 pH with 50% aqueous sodium hydroxide solution, filtered to remove insoluble humin, evaporated under reduced pressure at 50–60° C. until crystals of sodium chloride began to appear in the concentrate, and filtered to remove the crop of amino acids that had previously separated from solution. The filter cake was washed on the filter with a small proportion of cold water to remove adhering mother liquor, then mixed thoroughly with about 10 parts of dilute hydrochloric acid of such strength that the mixture had a pH of about 1.8. This dissolved substantially all of the product except tyrosine. The essentially tyrosine-free extract was filtered, stirred with activated carbon, refiltered, and evaporated under reduced pressure at 50 to 60° C. until a copious crop of leucine crystals appeared. The concentrate was cooled, allowed to stand several hours, and filtered. The filter cake after being washed with a little cold water and dried, consisted of the crude leucine used above.

*Example 7*

A leucine-rich fraction of amino acids was prepared from wheat gluten as follows: The dry granular gluten was refluxed 20 hours with aqueous 24% hydrochloric acid, using about 1.25 mols of acid per gram atom of nitrogen in the gluten. This amounts to about two parts of the aqueous acid per one part of 70% protein gluten. The reaction mixture was diluted with an equal volume of cold water and neutralized to about 5 pH with a concentrated aqueous solution of sodium hydroxide. Insoluble humin was filtered from the neutralized mixture, and the filtrate was evaporated under reduced pressure at 50 to 60° C. until a substantial crop of mixed amino acids, chiefly leucine and some tyrosine, appeared in the concentrate. The concentrate was cooled to room temperature and allowed to stand for a day or so to promote additional precipitation of the mixed amino acids. The cooled concentrate was then filtered, and the filter cake thus obtained was dried and pulverized.

A quantity of the dried filter cake representing 31 grams of mixed amino acids was dissolved in such a volume of 20° Bé. hydrochloric acid that when the resulting solution was mixed with the modified steepwater, the mixture had a pH of about 3.65. The proportion of added amino acids based on steepwater solids was about 1.4%. Use of this combination in the submerged culture fermentation production of penicillin increased the yield of penicillin about 8% over control runs.

*Example 8*

The proportion of mixed amino acids used in Example 7 was doubled, and the amount of 20° Bé. hydrochloric acid was adjusted to yield a final composition having a pH of about 3.65. The yield of penicillin was increased about 8% over the control.

*Example 9*

In this example, the proportion of mixed amino acids used in Example 7 was trebled, and the amount of hydrochloric acid again adjusted to yield a final pH of 3.65. In this case, the yield of penicillin was increased about 25% over control runs.

*Example 10*

The proportion of mixed amino acids in Example 7 was increased four fold, and the added hydrochloric acid adjusted to yield a combination of modified steepwater and mixed amino acids with a pH of 3.65. This combination increased the control yield of penicillin by about 33%.

*Example 11*

A protein hydrolyzate was prepared as follows: Dry granular corn gluten containing about 11% nitrogen was refluxed for 20 hours with aqueous 33% sulfuric acid, using 1.5 mols of the acid per gram atom of nitrogen in the gluten. The reaction mixture was diluted with three volumes of cold water and then partially neutralized to 3.9 pH with powdered lime. The mixture was then filtered to separate liquor from insoluble matter consisting mainly of humin and calcium sulfate. The filter cake was washed with hot water to free it of adhering liquor, and the washings were combined with the main filtrate. The combined washings and main filtrate were evaporated under reduced pressure at 50 to 60° C. to a density of about 30° Bé, measured at 40° C.

An aliquot of the concentrated hydrolyzate representing 65 grams of the original corn gluten protein was stirred into the modified steepwater, yielding a composition having a pH of about 3.85 and containing about 2% added amino acids based on steepwater solids. Use of this composition in the submerged culture fermentation production of penicillin increased the control yield of penicillin by about 8%.

Example 12

An aliquot of the concentrated whole corn gluten hydrolyzate representing 400 grams of protein was substituted for the smaller aliquot used in Example 11. The control yield of penicillin was increased by about the same amount, 8%, as produced by the smaller aliquot.

The invention is not limited to the specific materials and conditions recited in the foregoing examples, which are presented for illustrative purposes only.

Owing to the hydroscopic nature of some of the ingredients of corn steepwater, and to difficulties attending dehydration of the steepwater, it is more convenient to prepare and use the nutrient adjunct of this invention in a wet state than in the dry one. It is to be understood, however, that the invention encompasses the adjunct in a dry or apparently dry state, providing the steepwater alone or the combination of steepwater and amino acids is not subjected to such drastic heating conditions during dehydration that its desirable nutrient qualities are destroyed.

The following terms used hereinbefore and in the appended claims have the stated meanings:

*Penicillin.*—This is a generic term designating the antibiotic substances elaborated by certain molds of the Penicillium group, including the so-called synthetic penicillins of altered structure obtained by culturing the molds in media containing various specific organic supplements.

*Added amino acids.*—This term refers to the critical addition of amino acids other than the amounts of those substances naturally present in corn steepwater.

*Corn steepwater material* and *Corn steepwater nutrient adjunct.*—These are synonymous generic expressions designating the whole corn steepwater solids and biologically active fraction thereof which, when added to the culture media of microorganisms secreting antibiotic substances, stimulate the microorganisms to generate increased amounts of those substances.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of preparing a nutrient adjunct composition useful in the submerged fermentation culturing of penicillin-producing microorganisms comprising incorporating into concentrated corn steepwater a mineral acid solution of leucine, said leucine being added in a proportion not exceeding 10% by weight based on the total steepwater solids and said composition having a pH below that of said corn steepwater.

2. A nutrient adjunct composition useful in the submerged fermentation culturing of penicillin-producing microorganisms consisting essentially of concentrated corn steepwater and leucine, said leucine being present in a proportion not exceeding 10% by weight, based on the total steepwater solids.

3. In the manufacture of penicillin by the submerged fermentation culturing of penicillin-producing microorganisms in a substrate medium, the improvement comprising incorporating in the substrate medium stimulating proportions of the composition defined in claim 2.

WENDELL W. MOYER.

REFERENCES CITED

The following references are of record in the file of this patent:

UNITED STATES PATENTS

| Number | Name | Date |
|---|---|---|
| 1,434,462 | Wagner | Nov. 7, 1922 |
| 2,440,356 | Behrens | Apr. 27, 1948 |
| 2,442,141 | Moyer | May 25, 1948 |
| 2,448,791 | Foster et al. | Sept. 7, 1948 |

OTHER REFERENCES

White et al., "Archives of Biochemistry," vol. 8, 1945, pages 303–309.

Moyer et al., Jr. Bacteriology, vol. 51, January 1946, page 73.

Penicillin Interim Report (45–125), O. P. R. D.; W. P. B. The Pennsylvania State College, April 14, 1945, page one.

Coghill, Interim Report No. 23, U. S. D. A. Penicillin, article by Ward et al., pages 15 to 19.